United States Patent
Xie et al.

(10) Patent No.: US 10,986,191 B2
(45) Date of Patent: Apr. 20, 2021

(54) METHOD AND DEVICE FOR SCHEDULING RESOURCES

(71) Applicant: Alibaba Group Holding Limited, Grand Cayman (KY)

(72) Inventors: Yu Xie, Hangzhou (CN); Huining Yan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 372 days.

(21) Appl. No.: 15/443,920

(22) Filed: Feb. 27, 2017

(65) Prior Publication Data
US 2017/0251064 A1 Aug. 31, 2017

(30) Foreign Application Priority Data
Feb. 29, 2016 (CN) .......................... 201610111721.9

(51) Int. Cl.
*H04L 29/08* (2006.01)
*H04L 12/911* (2013.01)
*G06F 9/50* (2006.01)

(52) U.S. Cl.
CPC .......... *H04L 67/148* (2013.01); *G06F 9/5088* (2013.01); *H04L 47/726* (2013.01);
(Continued)

(58) Field of Classification Search
CPC combination set(s) only.
See application file for complete search history.

(56) References Cited

U.S. PATENT DOCUMENTS 8,392,572 B2 3/2013 Chang
2008/0222638 A1* 9/2008 Beaty .................. G06F 9/45558
718/100

(Continued)

FOREIGN PATENT DOCUMENTS

CN   201310041661     5/2013
CN   103856512 A      6/2014
WO   WO2015197564     12/2015

OTHER PUBLICATIONS

PCT Search Report and Written Opinion dated May 5, 2017 for PCT Application No. PCT/US17/19705, 9 pages.
(Continued)

*Primary Examiner* — Chris Parry
*Assistant Examiner* — Stephen J Houlihan
(74) *Attorney, Agent, or Firm* — Lee & Hayes, P.C.

(57) ABSTRACT

Disclosure method that includes traversing a user instance distribution of user instances of a user on hosts in a cluster to detect whether a trigger condition for user scheduling of adjustment of the user instance distribution is satisfied; migrating the user instance to be migrated out from the one or more hosts from which the user instances are to be migrated out to the one or more second hosts to which the one or more user instances are to be migrated in if the trigger condition for user scheduling is satisfied. The implementations of the present disclosure may schedule resources based on user instance distributions of users on hosts and achieve a balanced distribution of user instances. The implementations further avoid placing user instances of all users into a small number of hosts, increase the ability to prevent risks, and enhance the user experience.

20 Claims, 4 Drawing Sheets

(52) U.S. Cl.
CPC .......... *H04L 47/822* (2013.01); *H04L 47/826* (2013.01); *H04L 67/1008* (2013.01)

(56) References Cited

U.S. PATENT DOCUMENTS

| | | |
|---|---|---|
| 2010/0050172 A1 | 2/2010 | Ferris |
| 2012/0089726 A1 | 4/2012 | Doddavula |
| 2012/0297307 A1* | 11/2012 | Rider .................. G06F 11/32 715/736 |
| 2014/0195687 A1 | 7/2014 | Rewaskar et al. |
| 2015/0220356 A1 | 8/2015 | Khesin |
| 2015/0378753 A1 | 12/2015 | Phillips et al. |
| 2016/0021024 A1 | 1/2016 | Parikh |
| 2016/0043929 A1 | 2/2016 | Hao et al. |
| 2016/0266919 A1 | 9/2016 | Wang |
| 2016/0292608 A1 | 10/2016 | Yin et al. |
| 2017/0011076 A1 | 1/2017 | Wang et al. |
| 2017/0012892 A1 | 1/2017 | Zhang et al. |
| 2017/0060628 A1 | 3/2017 | Tarasuk-Levin et al. |
| 2017/0199770 A1* | 7/2017 | Peteva .................. G06F 9/5088 |

OTHER PUBLICATIONS

The Extended European Search Report dated Aug. 8, 2019 for European Patent Application No. 17760549.0, 9 pages.

The First Chinese Search Report dated Feb. 22, 2020 for Chinese Patent Application No. 2017100571533, 1 page.

English translated the First Chinese Office Action dated Mar. 2, 2020 for Chinese Patent Application No. 20170057153.3, a counterpart foreign application of U.S. Appl. No. 15/443,920, 18 pages.

* cited by examiner

METHOD AND DEVICE FOR SCHEDULING RESOURCES

CROSS REFERENCE TO RELATED PATENT APPLICATIONS

This application claims priority to Chinese Patent Application No. 201610111721.9, filed on Feb. 29, 2016, entitled "A Method and Device for Scheduling Resources," which is hereby incorporated by reference in its entirety.

TECHNICAL FIELD

The present disclosure relates to the field of computers, and particularly to a resource scheduling technology.

BACKGROUND

In the cloud industry, users can purchase a broad range of services according to their needs. As for the underlying cloud infrastructure industry, each service is a virtual machine or application allocated with certain resources according to user needs (CPU, memory, disk type and other consumable resources), also known as instances. These instances are carried on the actual distribution of a physical host. Most users have multiple same type or different types of services. Dynamic resource usages of instances result in a condition that host resource usages in a cluster are not balanced. High resource usages of the host lead to frequent failures due to resource competition, while low resource usages of the host lead to a waste of resources. An important question is how to rationally allocate these instances to make a cloud in a benign environment, to enable each host in a reasonably steady state, and to minimize risk when encountering abnormal situations. This question is important with respect to user experience and is a focus of resource scheduling.

However, conventional technology of cloud-computing-based resource scheduling generally does not take into account the distribution of user instances with the physical host and performs resource scheduling based solely on the current status of resources. Therefore, the conventional technology places user instances of all users into a small number of hosts. Once these hosts fail, all instances of the users would be affected. This cannot guarantee the quality of services and affect user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The implementations of the present disclosure relate to methods and apparatuses for scheduling resources to solve inconsistencies of user instance distributions.

According to an aspect of the present disclosure, some implementations relate to a method of scheduling resources. The method may include traversing a user instance distribution of user instances of a user on hosts in a cluster; detecting whether a trigger condition for user scheduling of adjustment of the user instance distribution is satisfied; determining one or more first hosts from which one or more user instances are to be migrated out in response to determining that the trigger condition for user scheduling is satisfied; and migrating the one or more user instances from the one or more first hosts to one or more second hosts to which the one or more user instances are to be migrated in. In some implementations, each of the one or more first hosts may include at least one user instance to be migrated out.

According to an aspect of the present disclosure, some implementations relate to an apparatus for scheduling resources. The apparatus may include a traversing module that traverses a user instance distribution of user instances of a user on hosts in a cluster; a user detection module that detects whether a trigger condition for user scheduling of adjustment of the user instance distribution is satisfied; a user determination module that determines one or more first hosts from which one or more user instances are to be migrated out in response to determining the trigger condition for user scheduling is satisfied, each of the one or more first hosts comprising at least one user instance to be migrated out; and a user migration module that migrates the one or more user instances from the one or more first hosts to one or more second hosts to which the one or more user instances are to be migrated in.

Compared with the conventional techniques, the present disclosure's techniques include traversing a user instance distribution of user instances on hosts in a cluster to detect whether a trigger condition for user scheduling of adjustment of the user instance distribution is satisfied. Further, the implementations include migrating the user instance to be migrated out from the one or more first hosts from which the user instance is to be migrated to the one or more second hosts to which the user instance is to be migrated in if the trigger condition for user scheduling is satisfied. The techniques of the present disclosure may schedule resources based on user instance distributions of users on hosts and achieve a balanced distribution of user instances. The techniques of the present disclosure further avoid placing user instances of all users into a small number of hosts, increase the ability to prevent risks, and enhance the user experience. Further, some implementations include migrating, based on a priority descending order, the user instances from the first hosts to the second hosts and therefore optimize resource scheduling.

BRIEF DESCRIPTION OF THE DRAWINGS

The Detailed Description is described with reference to non-limiting implementations of the accompanying figures, and other features, objects, and advantages of the present disclosure to become more apparent.

The use of the same reference numbers in different figures indicates similar or identical items.

DETAILED DESCRIPTION

Below in conjunction with the accompanying drawings, the implementations of the present disclosure are described in detail.

In this disclosure, as for a typical configuration, terminals, devices of the service network, and credible parties may include one or more processors (CPU), input/output interfaces, network interfaces, and memory.

The memory may include computer-readable medium volatile memory, random access memory (RAM) and/or nonvolatile memory, etc., such as read only memory (ROM) or flash memory (flash RAM). Computer-readable memory medium is an example.

Computer-readable media includes permanent and non-permanent, removable and non-removable media may be made in any method or technology to achieve information storage. Information can be a computer-readable instruction, data structures, program modules or other data. Examples of computer storage media include, but not limited to phase-change memory (PRAM), static random access memory (SRAM), dynamic random access memory (DRAM), other types of random-access memory (RAM), read-only memory (ROM), electrically erasable programmable Read Only memory (EEPROM), flash memory or other memory technology, CD-ROM read-only memory (CD-ROM), digital versatile disc (DVD) or other optical storage, magnetic cassettes, magnetic disk storage or other magnetic tape storage devices, or any other magnetic non-transmission medium, which can be used to store the information for access by computing devices. Defined in accordance with this present disclosure, Computer-readable media does not include non-transitory media, such as modulated data signal and carriers.

Figure 1:
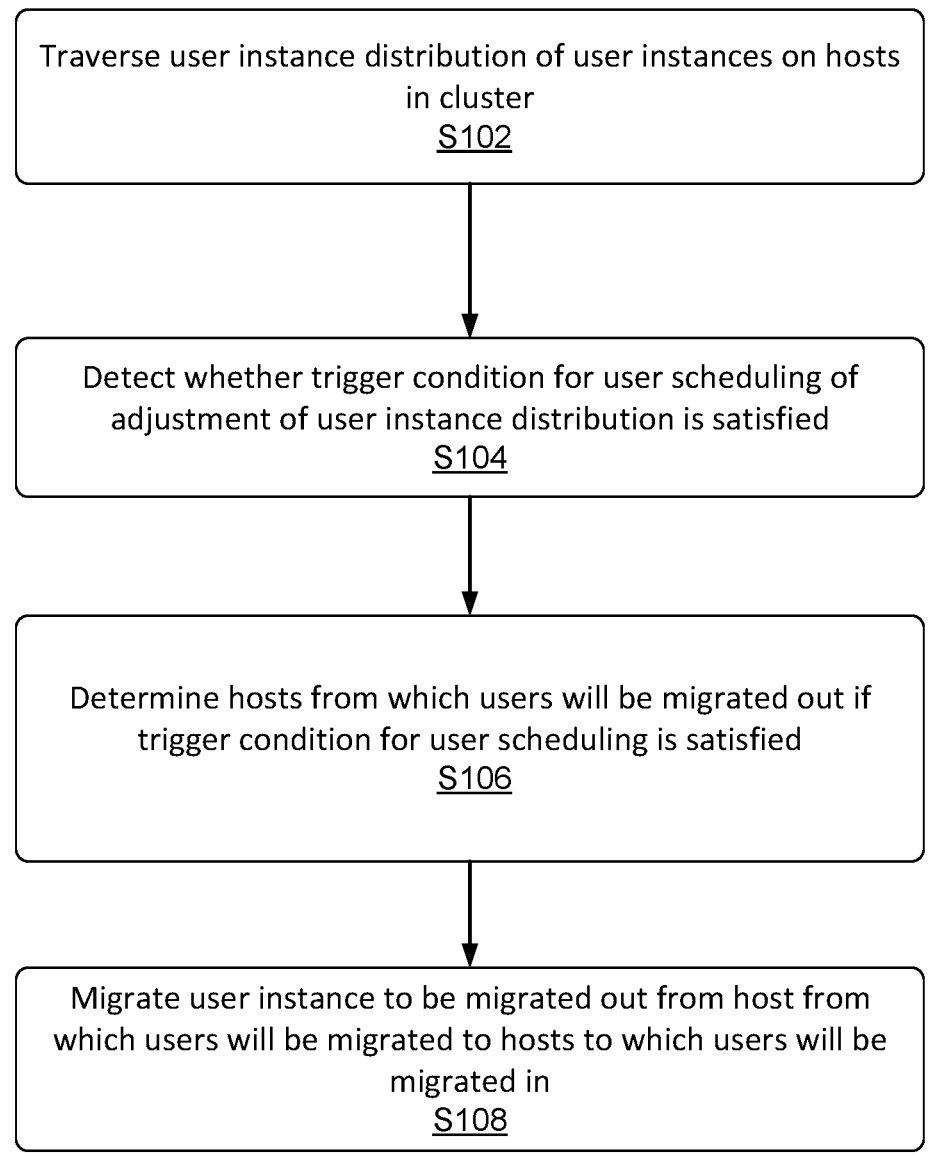
FIG. 1 is a flowchart illustrating a method of scheduling resources in accordance with an aspect of the present disclosure.

FIG. 1 is a flowchart illustrating a method of scheduling resources in accordance with an aspect of the present disclosure.

The method includes steps S102, S104, S106, and S108. In implementations, in step S102, a resource scheduling device 1 may traverse a user instance distribution of user instances of a user on hosts in a cluster. In step S104, the resource scheduling device 1 may detect whether a trigger condition for user scheduling of adjustment of the user instance distribution is satisfied. In step S106, the resource scheduling device 1 may determine one or more first hosts from which one or more user instances to be migrated out if the resource scheduling device 1 determines that the trigger condition for user scheduling is satisfied. In implementations, each of the first hosts may include at least one user instance to be migrated out. In step S108, the resource scheduling device 1 migrates a respective user instance to be migrated out from a respective first host to one or more second hosts to which the respective user instance is to be migrated in.

Here, the resource scheduling device 1 may include but is not limited to a user device, a network device, a combination of a user device and a network device via networks. The user device may include but not limited to mobile electronics configured to enable human-computer interactions via touch panels, such as smartphones and tablet computers. The mobile electronics can use any operating system, such as android operating system, iOS operating system, etc. The network device may include an electronic device that, based on a predetermined instruction, performs automatic calculation and information processing. The hardware of the network device may include but is not limited to a microprocessor, application specific integrated circuit (ASIC), programmable gate array (the FPGA), digital signal processor (DSP), embedded devices. The network device may include but is not limited to, a computer, a network host, a single network server, multi-server cluster, or a cloud including multiple servers. Here, the cloud may include a large number of computers or network servers with respect to cloud computing. Cloud computing is a distributed computing and includes a virtual supercomputer having a group of loosely coupled computer sets. The network may include, but is not limited to, the Internet, WAN, MAN, LAN, VPN network, a wireless ad hoc network (Ad Hoc network) and the like. In some implementations, the resource scheduling device 1 may be scripts that run on the user device, the network device, or the combination of user device and the network device via the network. Certainly, those skilled in the art should understand that the above resource scheduling device 1 is merely an example, other conventional or possible future resource scheduling devices as applicable to the present disclosure are also within the scope of protection of the present disclosure.

Operations of the resource scheduling device 1 are continuous. In implementations, in step S102, the resource scheduling device 1 may traverse a user instance distribution of user instances on hosts in a cluster. In step S104, the resource scheduling device 1 may detect whether a trigger condition for user scheduling of adjustment of the user instance distribution is satisfied. In step S106, if the trigger condition for user scheduling is satisfied, the resource scheduling device 1 may determine one or more corresponding first hosts from which the user instances to be migrated. In step S108, the resource scheduling device 1 may migrate the user instance to be migrated out from the one or more first hosts to one or more second hosts to which the one or more user instances to be migrated in until the resource scheduling device 1 stops working.

In step S102, the resource scheduling device 1 traverses a user instance distribution of user instances of users on hosts in a cluster.

In implementations, the user instance may include virtual machines or applications assigned on physical machines. In the cloud industry, the user instance corresponds to a service product purchased by a user (such as a certain amount of CPU, memory, disks and other consumable resources). The host refers to a physical machine for carrying a plurality of user instances. The cluster may include a collection of hosts with the same attributes. Here, a variety of ways to traverse may be used. For example, the users in the cluster may be traversed based on the order of numbers of user instances owned by each of the users from high to low or based on the order of times that the user instances were created from early to late.

In an example implementation, a computing device may traverse all users in the cluster to acquire a user instance distribution of each user in hosts of the cluster. Here, the computing device may further acquire usages of resource consumption for user instances and hosts (e.g., CPU, memory, disks) and the maximum usage of available consumable resources of each user (i.e., service products purchased by the user, for example, 2-Core CPU, 2G memory, 500G disk service specifications selected and purchased by the user). Accordingly, the computing device may determine a deviation value and equilibrium expectation value of the user instance and determine a deviation value and equilibrium expectation value of the host resource in the cluster.

For example, suppose there are N hosts in the cluster, for the user U, and the total number of instance resources purchased is I. Then, the equilibrium expectation value of user instance of U may be represented by:

$$E=[I/N]$$

that indicates a mean of instance resources of the hosts in the clusters and is rounded to an integer. Suppose that the cluster $\{H_1, H_2, \ldots, H_N\}$ includes N numbers of hosts and user U owns instances $\{I_{H1}, I_{H2}, \ldots, I_{HN}\}$, the deviation value of the user instance is:

$$S = \sqrt{\frac{1}{N}\sum_{i=1}^{N}(I_{Hi}-E)^2}$$

Suppose that the maximum host resource consumption of the N hosts in the cluster is $\{R_{H1}, R_{H2}, \ldots, R_{HN}\}$ respectively, and the current resource usage is $\{UR_{H1}, UR_{H2}, \ldots, UR_{HN}\}$ respectively, the equilibrium expectation value of the cluster is:

$$E_{UR} = \frac{\sum_{i=1}^{N} UR_{Hi}}{\sum_{i=1}^{N} R_{Hi}}$$

namely a ratio between the total volume of the resources consumed by the cluster and the maximum host resource consumption of the cluster. The deviation value of the host resource is:

$$S = \sqrt{\frac{1}{N}\sum_{i=1}^{N}\left(\frac{UR_{Hi}}{R_{Hi}} - E_{UR}\right)^2}$$

In step S104, the resource scheduling device 1 may detect whether a trigger condition for user scheduling of adjustment of the user instance distribution is satisfied.

Here, if the user instance distribution is not balanced, the trigger condition for user scheduling may be satisfied.

In implementations, the trigger condition for user scheduling may include at least one of that the user instance distribution may include at least one user instance that is higher than a corresponding threshold information of user instance, the user instance distribution may include at least one user instance of which deviation value is greater than a corresponding warning threshold information of user instance, and the user instance distribution may include at least one user instance that is greater than an upper limit of user instance equilibrium.

For example, turning back to the previous implementation, based on the user instance distribution of users in each host of the cluster, the deviation value of the user instance may be calculated based on a standard deviation equation. By a comparison between the deviation value of the user instance and a predetermined warning threshold information of user instance, the computing device may determine whether the trigger condition for user scheduling is satisfied. The upper limit of user instance equilibrium may include the upper limit of an interval of user instance equilibrium. For example, the upper limit and lower limit of the interval of user instance equilibrium may be calculated using the following equation: the upper limit of the interval of user instance equilibrium=the equilibrium expectation value of user instance+a predetermined parameter*the deviation value of the user instance; the lower limit of the interval of user instance equilibrium=the equilibrium expectation value of user instance−a predetermined parameter*the deviation value of the user instance. If the user instance distribution is higher than the upper limit of the interval of user instance equilibrium, the computing device may determine that the host is overloaded for user instances of the user. If the user instance distribution is lower than the lower limit of the interval of user instance equilibrium, the computing device may determine that a load of user instances of the user on the host is light. If the user instance distribution is located within the interval of user instance equilibrium (i.e., lower than the upper limit of the interval of user instance equilibrium and higher than the lower limit of the interval of user instance equilibrium, the computing device may determine that the host is balanced for user instances of the user. Here, threshold information of user instance may be set for user instances, such as one shall not be beyond the service specification purchased by the user.

In step S106, if the resource scheduling device 1 determines that the trigger condition for user scheduling is satisfied, the resource scheduling device 1 may determine one or more first hosts from which one or more user instances are to be migrated out. In some implementations, each host from which the user instances are to be migrated may include at least one user instance to be migrated out.

For example, the resource scheduling device may place users of which the trigger condition for user scheduling is satisfied into a user list to be scheduled. Based on the user instance distribution of each user in the user list on each host, the resource scheduling device may compare the user instance distribution to the interval of user instances equilibrium. If the user instance distribution is higher than the upper limit of the interval of user instance equilibrium, the resource scheduling device may place the host of the user instance into the user host list to be migrated out.

In step S108, the resource scheduling device 1 may migrate the user instance to be migrated out from the one or more firsts hosts from which user instances are to be migrated to the one or more second hosts to which the one or more user instances are to be migrated in.

For example, turning back to the previous implementation, if the user instance distribution is higher than the upper limit of the interval of user instance equilibrium, the resource scheduling device may designate the instance as a user instance to be migrated out. If the user instance distribution is lower than the lower limit of the interval of user instance equilibrium, the resource scheduling device may place the host into the user host list. Here, the resource scheduling device may migrate the user instance to be migrated out from the one or more first hosts to the one or more second hosts.

In implementations, in step S108, the resource scheduling device 1 may migrate, based on the priority descending order, the user instances to be migrated out from the one or more first hosts to the one or more second hosts.

In implementations, for each user in the user list to be scheduled, based on the priority descending order of user instances to be migrated out, the resource scheduling device 1 migrate the user instance to be migrated out from the one or more first hosts to the one or more second hosts.

In implementations, the method may further include determining a priority of the user instance to be migrated out based on at least one of quantity information of user instances to be migrated out, equilibrium information among user instances, or resource consumption for user instances.

For example, the bigger the number of the user instances to be migrated out, the higher priority is. The worse equilibrium among the user instances (e.g., the higher the deviation value of the user instance is) is, the higher priority is. The more the resource of the user instance (e.g., CPU, memory, disk) is consumed, the higher priority is.

In implementations, the second host to which the user instance to be migrated in may include idle hosts or hosts having the capacity for user instances to be migrated in and corresponding to the user instance.

For example, an idle host refers to a host having a user instance distribution that is zero. A host having the capacity for user instances to be migrated in refers to a host having a user instance distribution that is not zero but lower than the lower limit of the interval of user instance equilibrium.

In implementations, in step S108, the resource scheduling device 1 may migrate the user instance to be migrated out from the host from which user instances are to be migrated out to one or more hosts to which the one or more user instances are to be migrated in such that host resource consumption is not greater than the corresponding equilibrium expected threshold of resource consumption after the second hosts accepts the user instance to be migrated out.

In implementations, for each user in the user list to be scheduled, the second host to which user instances of the user instances are to be migrated in may include a sub-cluster having idle hosts and a sub-cluster having hosts having the capacity for user instances to be migrated in. In these instances, the sub-cluster having idle hosts has priority to be migrated in as compared to the sub-cluster having hosts having the capacity for user instances to be migrated in. As for the sub-cluster having hosts having the capacity for user instances to be migrated in, user instances are firstly migrated to hosts having lower host resource consumption based on the order of host resource consumption from low to high. After the user instance is migrated to the host to which user instances to be migrated, the host will consume not greater than a corresponding equilibrium expected threshold of resource consumption (i.e., an upper limit of user instance equilibrium). If the host to which the user instance to be migrated does not exist (e.g., the user instance distribution is lower than the upper limit of user instance equilibrium of the host), the user instance is not migrated.

Figure 2:
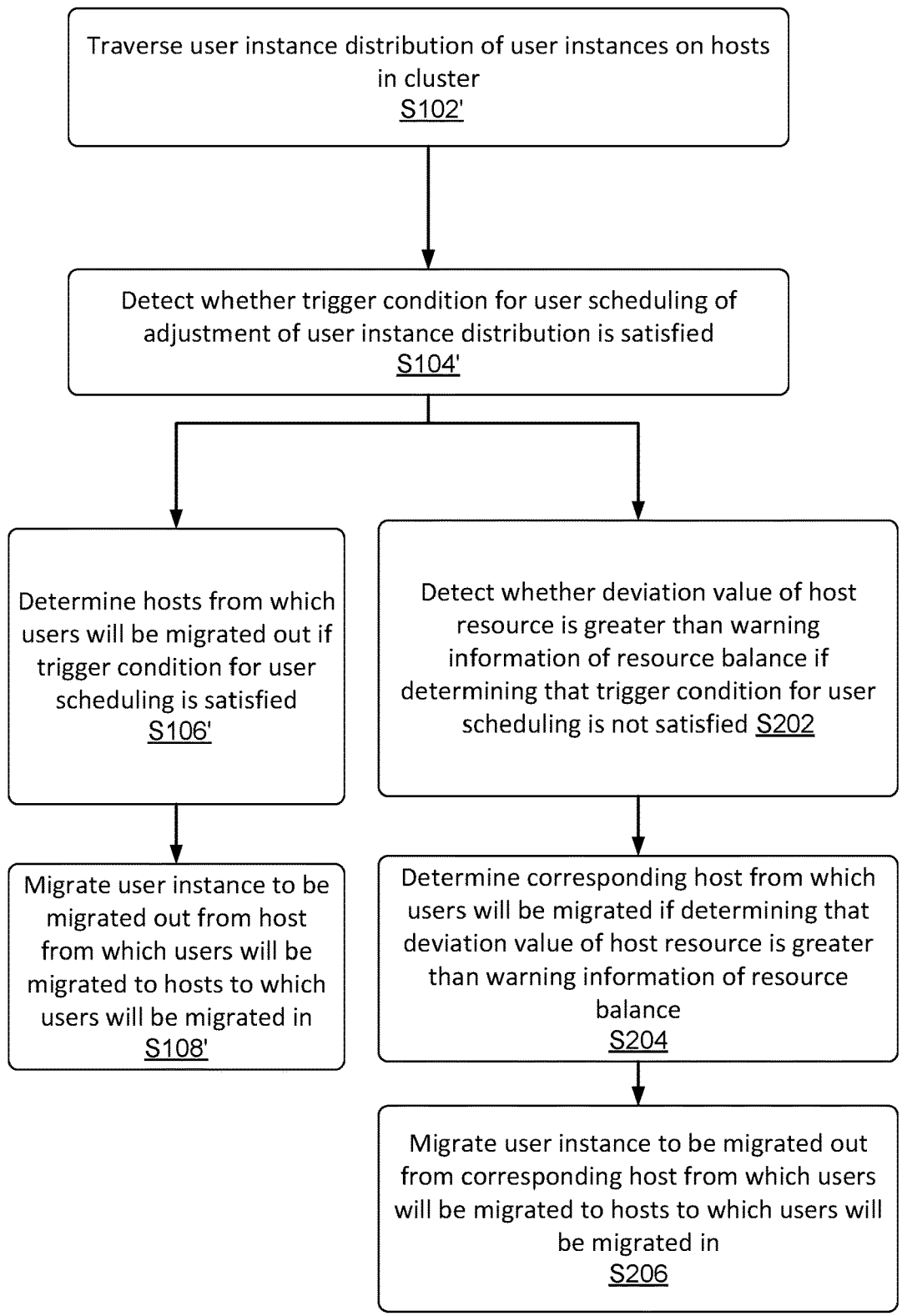
FIG. 2 is a flowchart illustrating a method of scheduling resources in accordance with an implementation of the present disclosure.

FIG. 2 is a flowchart illustrating a method of scheduling resources in accordance with an implementation of the present disclosure.

The method includes steps S102', S104', S106', S108', S202, S204, and S206. Here, steps S102, S104, S106, and S108 are similar to steps S102', S104', S106', and S108'. For brevity, similarities are not mentioned here.

In implementations, in step S202, the resource scheduling device 1 may detect whether a deviation value of the host resource is greater than warning information of resource balance if the resource scheduling device 1 determines that the trigger condition for user scheduling is not satisfied. In step S204, the resource scheduling device 1 may determine one or more corresponding first hosts from which the user instances to be migrated out if the resource scheduling device 1 determines that the deviation value of the host resource is greater than the warning information of resource balance. In step S206, the resource scheduling device 1 may migrate a respective user instance to be migrated out from the corresponding first host to the one or more second hosts to which the respective user instance is to be migrated in.

For example, based on the total volume of the resources consumed by the cluster and the maximum host resource consumption of the cluster, the deviation value of the host resource of the cluster may be calculated based on a standard deviation equation. If the deviation value of the host resource is greater than the warning information of resource balance, the computing device (e.g., the resource scheduling device 1) may migrate the user instance to be migrated out from the first host from which the user instance is to be migrated to one or more second hosts to which the user instance is to be migrated in. Hosts from which user instances are to be migrated out include hosts having host resource consumption higher than the corresponding threshold of resource consumption in the cluster. Hosts to which the user instances are to be migrated in include hosts having host resource consumption lower than the corresponding threshold of resource consumption in the cluster.

In implementations, the resource scheduling device 1 may enter into a sleep state if the trigger condition for user scheduling is not satisfied and the deviation value of the host resource is lower than the warning information of resource balance. Alternatively, the resource scheduling device 1 may enter into a sleep state after the user instance to be migrated out is migrated from the one or more corresponding first hosts to the one or more second hosts. When the predetermined time threshold of sleep status is reached, a timer may trigger the resource scheduling device 1 to enter an operating state from the sleep state.

In implementations, in step S206, the resource scheduling device 1 may migrate the user instance to be migrated out from the first host from which the user instance is to be migrated out to the one or more second hosts to which the one or more user instances are to be migrated in based on the order of resource consumption for user instances from high to low.

In implementations, according to users to which the user instances on the hosts belong to, the computing device may rank the user instances based on the resource consumption for user instances and preferably migrate the user instances out of the hosts having higher resource consumption as well as preferably migrate the user instances to the hosts having lower resource consumption.

In implementations, in step S206, the resource scheduling device 1 may migrate the user instance to be migrated out from the first host to the one or more second hosts such that user instances of a user on the second hosts satisfy equilibrium expectation of user instance after the user instance to be migrated out is migrated to the host to which user instances are to be migrated.

For example, after the user instance is migrated to the second host, the user instance distribution of a user owning the user instances on the second host locates within the interval of user instance equilibrium.

Figure 3:
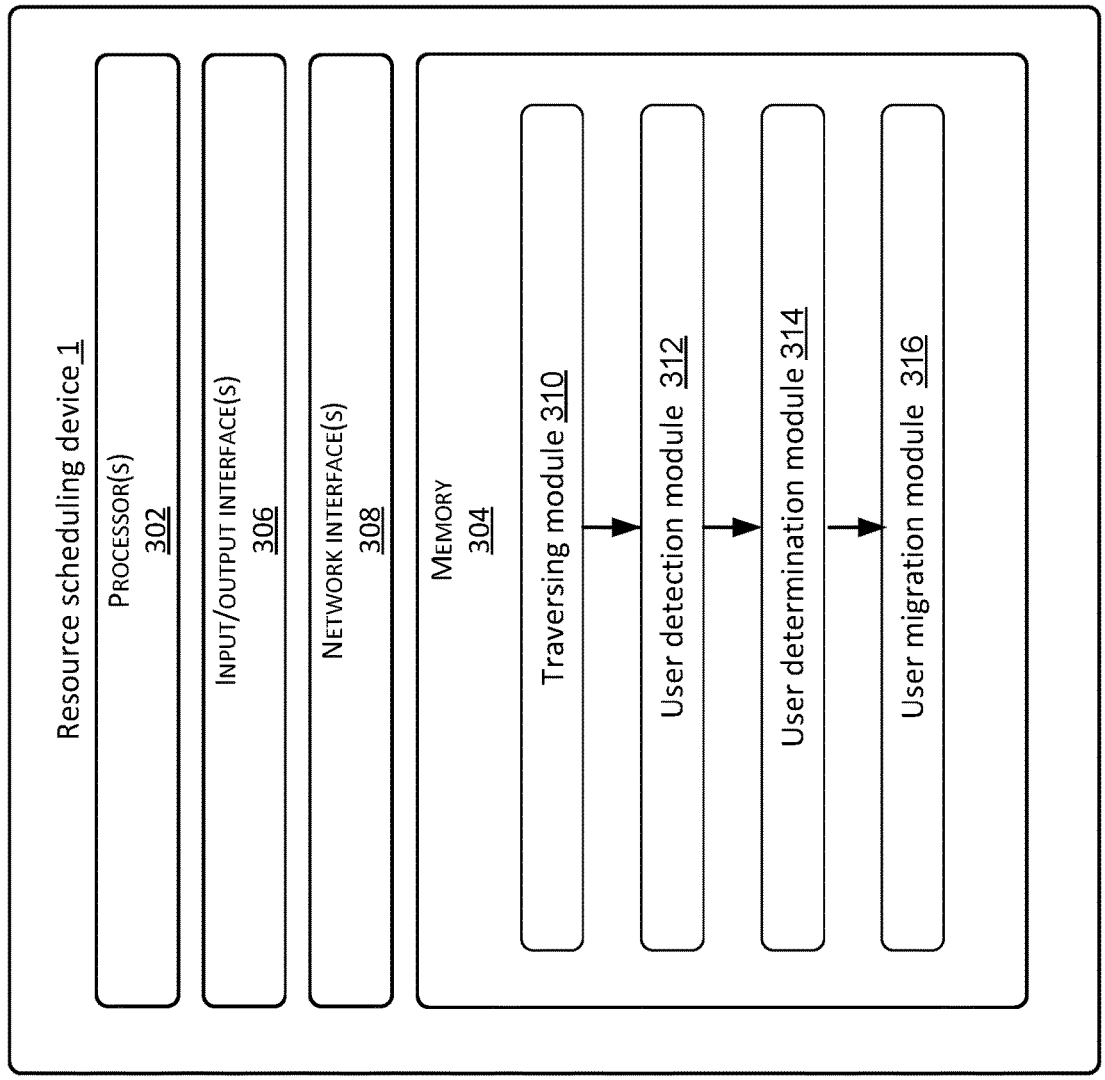
FIG. 3 is a schematic diagram illustrating an apparatus for scheduling resources in accordance with an aspect of the present disclosure.

FIG. 3 is a schematic diagram illustrating another aspect of the resource scheduling device 1. The resource scheduling device 1 may include one or more processor(s) 302 or data processing unit(s) and memory 304. The resource scheduling device 1 may further include one or more input/output interface(s) 306, and network interface(s) 308. The memory 304 is an example of computer-readable media.

The memory 304 may store therein a plurality of modules or units including a traversing module 310, a user detection module 312, a user determination module 314, and a user migration module 316.

In implementations, the traversing module 310 may traverse a user instance distribution of user instances of a user on hosts in a cluster; the user detection module 312 may detect whether a trigger condition for user scheduling of adjustment of the user instance distribution is satisfied; the resource scheduling device 1 may determine one or more first hosts from which one or more user instances are to be migrated out if the user determination module 314 determines that the trigger condition for user scheduling is satisfied. In these instances, each host from which the user instance is to be migrated may include at least one user instance to be migrated out. Further, the user migration module 316 may migrate the user instance to be migrated out from a first hosts to one or more second hosts.

Here, the resource scheduling device 1 may include, but is not limited to, a user device, a network device, a combination of a user device and a network device via networks. The user device may include, but is not limited to, mobile electronics configured to enable human-computer interactions via touch panels, such as smartphones, tablet computers. The mobile electronics can use any operating system, such as android operating system, iOS operating system, etc. The network device may include an electronic device that, based on a predetermined instruction, performs automatic calculation and information processing. The hardware of the network device may include but is not limited to a microprocessor, application specific integrated circuit (ASIC), programmable gate array (the FPGA), digital signal processor (DSP), embedded devices. The network device may include but not limited to a computer, a network host, a single network server, multi-server cluster, or a cloud including multiple servers. Here, Cloud may include a large number of computers or network servers based on cloud computing. Cloud computing is a distributed computing and includes a virtual supercomputer having a group of loosely coupled computer set. The network may include but not limited to the Internet, WAN, MAN, LAN, VPN network, a wireless ad hoc network (Ad Hoc network) and the like. In some implementations, the resource scheduling device 1 may be scripts that run on the user device, the network device, or the combination of user device and the network device via the network. In some implementations, skilled in the art should be understood that the above resource scheduling device 1 is merely an example, other conventional or possible future resource scheduling device 1 as applicable to the present disclosure are also within the scope of protection of the present disclosure.

Operations of the above-described devices are continuous. Here, those skilled in the art will appreciate that "continuous" refers to the above-described devices work respectively in real time or according to a preset or timely adjusted operating mode. For example, the traversing module 310 may continuously traverse a user instance distribution of user instances of a user on hosts in a cluster; the user detection module 312 may continuously detect whether a trigger condition for user scheduling of adjustment of the user instance distribution is satisfied; the user determination module 314 may continuously determine one or more corresponding first hosts if the trigger condition for user scheduling is satisfied; the user migration module 316 may continuously migrate the user instance to be migrated out from the first host to one or more second hosts until the resource scheduling device 1 stops.

The traversing module 310 may traverse a user instance distribution of user instances for a user on hosts in a cluster.

In implementations, the user instance may include virtual machines or applications assigned on physical machines. In the cloud industry, the user instance corresponds to a service product purchased by users (such as a certain amount of CPU, memory, disks and other consumable resources). The host refers to a physical machine for carrying a plurality of the user instance. The cluster may include a collection of hosts with the same attributes. Here, a variety of ways to traverse may be used. For example, users in the cluster may be traversed based on the order of numbers of user instances owned by the users from high to low or based on the order of times that the user instances were created from early to late.

In implementations, a computing device may traverse all users in the cluster to acquire a user instance distribution of user instances of each user in hosts of the cluster. Here, the computing device may further acquire usages of resource consumption for user instances and hosts (e.g., CPU, memory, disks) and the maximum usage of available consumable resources of each user (i.e., service products purchased by the user, for example, 2-Core CPU, 2G memory, 500G disk service specifications selected and purchased by the user). Accordingly, the computing device may determine a deviation value and equilibrium expectation value of the user instance for a user and determine a deviation value and equilibrium expectation value of the host resource in the cluster.

For example, suppose there are N hosts in the cluster, for the user U, and the total number of instance resources purchased is I. Then, the equilibrium expectation value of user instance of U may be represented by:

$$E=[I/N]$$

that indicates a mean of instance resources of the hosts in the clusters and is an integer. Suppose that the cluster $\{H_1, H_2, \ldots, H_N\}$ includes N numbers of hosts and user U owns instances $\{I_{H1}, I_{H2}, \ldots, I_{HN}\}$. Then, the deviation value of the user instance is:

$$S = \sqrt{\frac{1}{N}\sum_{i=1}^{N}(I_{Hi} - E)^2}$$

Suppose that the maximum host resource consumption of the N hosts in the cluster is $\{R_{H1}, R_{H2}, \ldots, R_{HN}\}$, respectively, and the current resource usage is $\{UR_{H1}, UR_{H2}, \ldots, UR_{HN}\}$, respectively. Then, the equilibrium expectation value of the cluster is:

$$E_{UR} = \frac{\sum_{i=1}^{N}UR_{Hi}}{\sum_{i=1}^{N}R_{Hi}}$$

namely, a ratio between the total volume of the resources consumed by the cluster and the maximum host resource consumption of the cluster. The deviation value of the host resource is:

$$S = \sqrt{\frac{1}{N}\sum_{i=1}^{N}\left(\frac{UR_{Hi}}{R_{Hi}} - E_{UR}\right)^2}$$

The user detection module 312 may detect whether a trigger condition for user scheduling of adjustment of the user instance distribution is satisfied.

Here, the trigger condition for user scheduling may be satisfied if the user instance distribution is not balanced.

In implementations, the trigger condition for user scheduling may include at least one of that the user instance distribution may include at least one user instance that is higher than a corresponding threshold information of user instance, that the user instance distribution may include at least one user instance of which deviation value is greater than a corresponding warning threshold information of user instance, and that the user instance distribution may include at least one user instance that is greater than an upper limit of user instance equilibrium.

For example, turning back to the previous implementation, based on the user instance distribution of users in each host of the cluster, the deviation value of the user instance may be calculated based on a standard deviation equation. By a comparison between the deviation value of the user instance and a predetermined warning threshold information of user instance, the computing device may determine whether the trigger condition for user scheduling is satisfied. The upper limit of user instance equilibrium may include the upper limit of an interval of user instance equilibrium. For example, the upper limit and lower limit of the interval of user instance equilibrium may be calculated using the following equation: the upper limit of the interval of user instance equilibrium=the equilibrium expectation value of user instance+a predetermined parameter*the deviation value of the user instance; the lower limit of the interval of user instance equilibrium=the equilibrium expectation value of user instance−a predetermined parameter*the deviation value of the user instance. If the user instance distribution is higher than the upper limit of the interval of user instance equilibrium, the computing device may determine that the host is overloaded for user instances of the user. If the user instance distribution is lower than the lower limit of the interval of user instance equilibrium, the computing device may determine that a load of user instances of the user on the host is light. If the user instance distribution is located within the interval of user instance equilibrium (i.e., lower than the upper limit of the interval of user instance equilibrium and higher than the lower limit of the interval of user instance equilibrium, the computing device may determine that the host is balanced for user instances of the user. Here, threshold information of user instance may be set for user instances, for example, less than the service specification purchased by the user.

The user determination module 314 may determine one or more hosts from which one or more user instances to be migrated out if the trigger condition for user scheduling is satisfied. In some implementations, each first host from which a user instance is to be migrated may include at least one user instance to be migrated out.

For example, the computing device may place users of which the trigger condition for user scheduling is satisfied into a user list to be scheduled. Based on the user instance distribution of each user in the user list on each host, the computing device may compare the user instance distribution to the interval of user instances equilibrium. The computing device may place the host of the user instance into the user host list to be migrated out if the user instance distribution is higher than the upper limit of the interval of user instance equilibrium.

The user migration module 316 may migrate the user instance to be migrated out from the first host from which user instances are to be migrated to the one or more second hosts to which the one or more user instances are to be migrated in.

For example, turning back to the previous implementation, the computing device may designate a user instance as user instance to be migrated out if the user instance distribution is higher than the upper limit of the interval of user instance equilibrium. If the user instance distribution is lower than the lower limit of the interval of user instance equilibrium, the computing device may place the host into the user host list. Here, the computing device may migrate the user instance to be migrated out from the first host from which the one or more user instances are to be migrated to one or more second hosts to which the one or more user instances are to be migrated in.

In implementations, the user migration module 316 may migrate, based on the priority descending order, the user instance to be migrated out from the first host to one or more second hosts.

In implementations, for each user in the user list to be scheduled, the resource scheduling device 1 migrate the user instance to be migrated out from the first host to one or more second hosts based on the priority descending order of user instances to be migrated out.

In implementations, the resource scheduling device 1 may further include a priority module (not shown in FIGS.) stored on memory 304. The priority module may determine a priority of the user instance to be migrated out based on at least one of quantity information of user instances to be migrated out, equilibrium information among user instances, and resource consumption for user instances.

For example, the bigger the number of the user instances to be migrated out is, the higher priority is. The worse equilibrium among the user instances (e.g., the higher the deviation value of the user instance is) is, the higher priority is. The more the resource of the user instance (e.g., CPU, memory, disk) is consumed, the higher priority is.

In implementations, the second hosts may include idle hosts or hosts having the capacity for user instances to be migrated in and corresponding to the user instance.

For example, an idle host refers to a host having a user instance distribution that is zero. A host having the capacity for user instances to be migrated in refers to a host having a user instance distribution that is not zero but lower than the lower limit of the interval of user instance equilibrium.

In implementations, the user migration module 316 may migrate the user instance to be migrated out from the first host to the one or more second hosts such that host resource consumption is not greater than the corresponding equilibrium expected threshold of resource consumption after the second hosts accept the user instance to be migrated out.

In implementations, for each user in the user list to be scheduled, the host to which the user instances are to be migrated may include a sub-cluster having idle hosts and a sub-cluster having hosts having the capacity for user instances to be migrated in. The sub-cluster having idle hosts has priority to be migrated in as compared to the sub-cluster having hosts having the capacity for user instances to be migrated in. As for the sub-cluster having hosts having the capacity for user instances to be migrated in, user instances are firstly migrated to hosts having lower host resource consumption based on the order of host resource consumption from low to high to ensure that, after the user instances are migrated to the host to which the user instances are to be migrated in, the host will consume not greater than a corresponding equilibrium expected threshold of resource consumption (i.e., an upper limit of user instance equilibrium). If the host to which the user instance is to be migrated in does not exist (e.g., the user instance distribution is lower than the upper limit of user instance equilibrium of the host), the computing device may not migrate the user instance.

Figure 4:
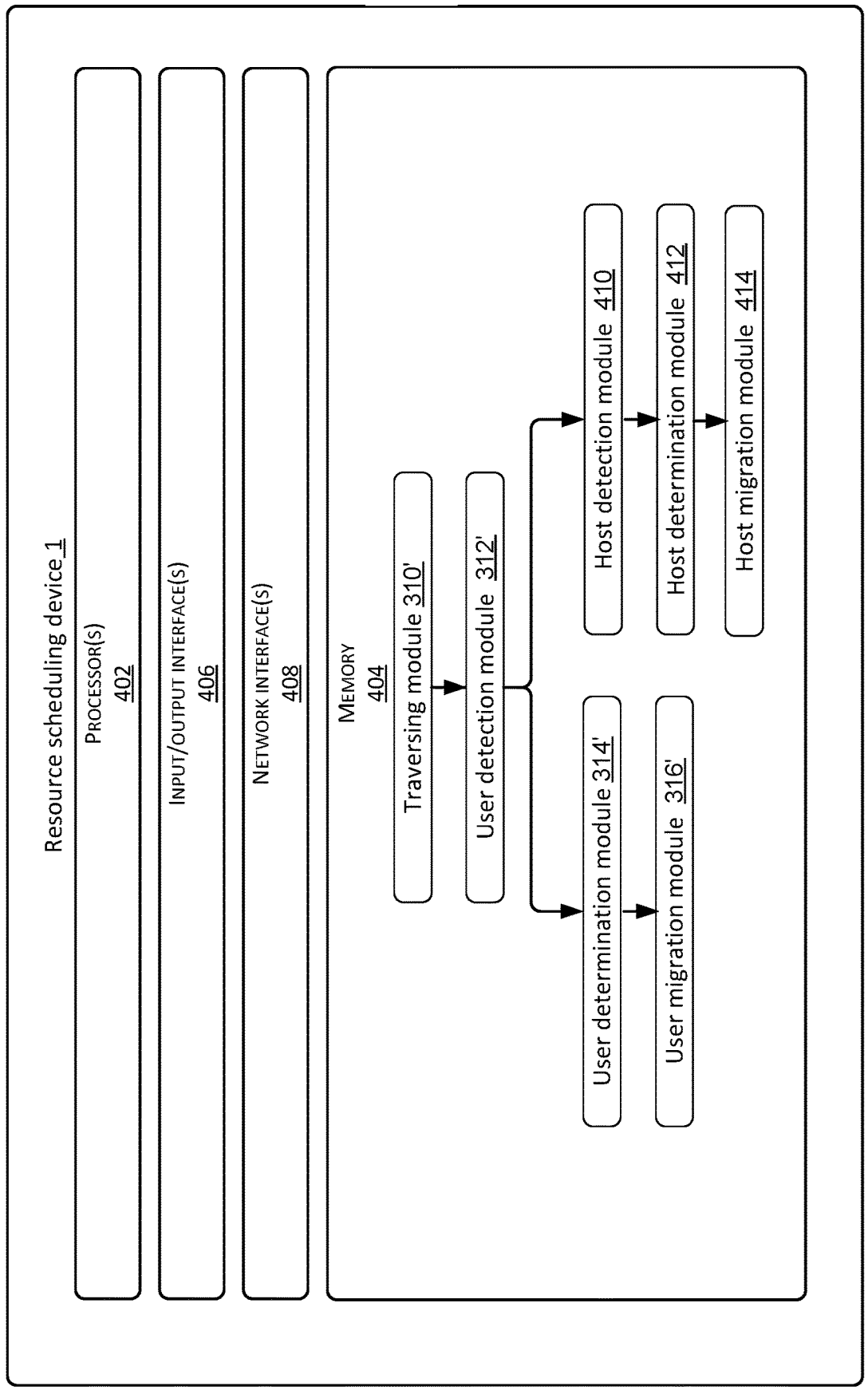
FIG. 4 is a schematic diagram illustrating an apparatus for scheduling resources in accordance with an implementation of the present disclosure.

FIG. 4 is a schematic diagram illustrating the resource scheduling device 1 in accordance with an implementation of the present disclosure. The resource scheduling device 1 may include one or more processor(s) 402 or data processing unit(s) and memory 404. The resource scheduling device 1 may further include one or more input/output interface(s) 406, and network interface(s) 408. The memory 404 is an example of computer-readable media.

The memory 404 may store therein a plurality of modules or units including a traversing module 310', a user detection module 312', a user determination module 314', a user migration module 316', a host detection module 410, a host determination module 412, and a host migration module 414.

Here, the traversing module 310, the user detection module 312, the user determination module 314, and the user migration module 316 are same as or similar to the traversing module 310', the user detection module 312', the user determination module 314', and the user migration module 316', which are not detailed herein for brevity.

In some implementations, the host detection module 410 may detect whether a deviation value of the host resource is greater than warning information of resource balance if the host detection module 410 determines that the trigger condition for user scheduling is not satisfied. If the host determination module 412 determines that the deviation value of the host resource is greater than the warning information of resource balance, the host determination module 412 may determine one or more corresponding first hosts from which user instances are to be migrated out. Further, the host migration module 414 may migrate the user instance to be migrated out from the one or more first hosts to the one or more second hosts.

For example, the deviation value of the host resource of the cluster may be calculated based on a standard deviation equation based on the total volume of the resources consumed by the cluster and the maximum host resource consumption of the cluster. If the deviation value of the host resource is greater than the warning information of resource balance, the computing device may migrate the user instance to be migrated out from the first host to one or more second hosts. The first hosts may include hosts having host resource consumption higher than the corresponding threshold of resource consumption in the cluster. The second hosts include hosts having host resource consumption lower than the corresponding threshold of resource consumption in the cluster.

In implementations, the resource scheduling device 1 may enter into a sleep state if the trigger condition for user scheduling is not satisfied and the deviation value of the host resource is lower than the warning information of resource balance. Alternatively, after the user instance to be migrated out is migrated from the first host to the one or more second hosts, the resource scheduling device 1 may enter into a sleep state. When the predetermined time threshold of sleep status is reached, a timer may trigger the resource scheduling device 1 to enter an operating state from the sleep state.

In implementations, the host migration module 414 may migrate the user instance to be migrated out from the first host to the one or more second hosts based on the order of resource consumption for user instances from high to low.

In implementations, per users of user instances on the host from which the user instances are to be migrated out, the computing device may rank the user instances based on the resource consumption for user instances and migrate the user instances out of the hosts having higher resource consumption in priority as well as migrate the user instances to the hosts having lower resource consumption in priority.

In implementations, the host migration module 414 may migrate the user instance to be migrated out from the first host to the one or more second hosts such that the user instances of the user on the second hosts satisfy equilibrium expectation of user instances after the user instance is migrated to the second hosts.

For example, after the user instance is migrated to the second host, the user instance distribution of the user instances of the second user on the second host locates within the interval of user instance equilibrium.

Compared with the conventional techniques, techniques of the present disclosure include traversing a user instance distribution of user instances of a user on hosts in a cluster to detect whether a trigger condition for user scheduling of adjustment of the user instance distribution is satisfied. Further, the techniques include migrating the user instance to be migrated out from the first host from which the user instance is to be migrated to the one or more second hosts to which the user instance is to be migrated in if the trigger condition for user scheduling is satisfied. The implementations of the present disclosure may schedule resources based on user instance distributions of user instances of users on hosts and achieve a balanced distribution of user instances. The implementations further avoid placing all user instances of the same user into a small number of hosts, increase the ability to prevent risks, and enhance the user experience. Further, some implementations of the techniques of the present disclosure include migrating, based on a priority descending order, the user instance to be migrated out from the first host to one or more second hosts and thus optimize resource scheduling.

It should be noted that the present disclosure may be entirely implemented by hardware, software, or a combination of hardware and software. For example, the present disclosure may be implemented using a specific integrated circuit (ASIC), a general-purpose computer or any other similar hardware. In some implementations, application software/program may be implemented by a processor to perform the steps or functions described above. Similarly, the application software/programs (including associated data structures) may be stored in a computer-readable recording medium, for example, RAM memory, magnetic or optical drive or floppy disk and similar devices. In addition, some steps or features of this present disclosure may be implemented in hardware including, for example, processors and circuits performing certain steps and/or functions.

In addition, part of this present disclosure may be implemented as a computer program product. For example, computer-executable instructions, when executed by a computing device, may call or provide methods or technical solutions of the present disclosure. The called computer-executable instructions according to the present disclosure may be stored in memory such as fixed or removable recording medium, and/or be transmitted via the data stream, radio or other signaling carriers, and/or be stored in working memory of a computing device that runs the computer program instructions. Here, an implementation of the present disclosure includes an apparatus, which includes a memory storing computer-executable instructions and one or more processor for executing the computer-executable instructions. When the computer-executable instructions are executed, methods and/or technical solutions of the techniques of the present disclosure may be performed by the apparatus.

Those skilled in the art should understand that the implementations of the present disclosure are not limited to those detailed example implementations. Without conflict, the present disclosure may be achieved by other implementations. Accordingly, the above-described descriptions are merely illustrative and non-limiting, and the scope of the disclosure includes the scope of the appended claims. Therefore, all changes intended to fall within the scope of claims and equivalents are within the scope of the present application. Any references to FIGS. in claims should not be seen as the right to limit the claims. In addition, apparently "comprising" does not exclude other elements or steps, and singular does not exclude a plurality. A plurality of units or means recited in the claims refer to one or more units/devices or one or more units/devices via hardware and software. The first and the second are used to indicate names rather than any particular order.

What is claimed is:

1. A method for scheduling resources, the method comprising:
   traversing a user instance distribution of multiple user instances of a user on multiple hosts in a cluster;
   detecting that a trigger condition for user scheduling of adjustment of the user instance distribution is satisfied;
   determining one or more first hosts from which one or more user instances are to be migrated out at least based on equilibrium information among the multiple user instances, the equilibrium information including a deviation value of a respective user instance from an equilibrium expectation value of host resources of the multiple hosts in the cluster based on a maximum host resources consumption of the multiple hosts in the cluster and current resource usage of the multiple hosts in the cluster, each of the one or more first hosts comprising at least one user instance to be migrated out; and
   migrating the one or more user instances from the one or more first hosts to one or more second hosts.

2. The method of claim 1, wherein the trigger condition for user scheduling comprises that the user instance distribution includes at least one user instance that is higher than a corresponding threshold information of user instance.

3. The method of claim 1, wherein the trigger condition for user scheduling comprises that the user instance distribution includes at least one user instance of which deviation value is greater than a corresponding warning threshold information of user instance.

4. The method of claim 1, wherein the trigger condition for user scheduling comprises that the user instance distribution includes at least one user instance that is greater than an upper limit of user instance equalization.

5. The method of claim 1, wherein the migrating the one or more user instances from the one or more first hosts to the one or more second hosts comprises:
   migrating, based on a priority descending order, the one or more user instances from the one or more first hosts to the one or more second hosts.

6. The method of claim 5, further comprising:
   determining the priority descending order based on at least one of:
   quantity information of the one or more user instances to be migrated out; and
   resource consumption for the multiple user instances.

7. The method of claim 1, wherein the one or more second hosts comprise an idle host or a host that has capacity for a respective user instance to be migrated in and corresponds to the respective user instance.

8. The method of claim 1, wherein the migrating the one or more user instances from the one or more first hosts to the one or more second hosts comprises:
   migrating the one or more user instances from the one or more first hosts to the one or more second hosts based on a condition that a host resource consumption is not greater than a corresponding equilibrium expected threshold of resource consumption after the one or more second hosts accept the one or more user instance.

9. The method of claim 1, further comprising:
   detecting whether a deviation value of host resource is greater than a warning information of resource balance in response to determining that the trigger condition for user scheduling is not satisfied; and
   determining the one or more first hosts in response to determining that the deviation value of the host resource is greater than the warning information of resource balance.

10. The method of claim 9, wherein the migrating the one or more user instances from the one or more first hosts to the one or more second hosts comprises:
    migrating the one or more user instances from the one or more first hosts to the one or more second hosts based on an order of resource consumption for user instances from high to low.

11. The method of claim 9, wherein the migrating the one or more user instances from the one or more first hosts to the one or more second hosts n comprises:
    migrating the one or more user instances from the one or more first hosts to the one or more second hosts when the user instances satisfy an equalization expectation of the user instances after the one or more user instances are migrated to the one or more second hosts.

12. An apparatus comprising:
    one or more processors; and
    one or more memories storing computer-executable instructions that, when executed by the one or more processors, cause the one or more processors to perform acts comprising
    traversing a user instance distribution of user instances of a user on one or more hosts in a cluster;
    detecting that a trigger condition for user scheduling of adjustment of the user instance distribution is satisfied;
    determining one or more first hosts from which one or more user instances are to be migrated out at least based on equilibrium information among the multiple user instances, the equilibrium information including a deviation value of a respective user instance from an equilibrium expectation value of host resources of the multiple hosts in the cluster, the equilibrium expectation value of the host resources of the multiple hosts in the cluster representing a ratio between a total volume of the resources consumed by the cluster and a maximum host resource consumption of the cluster, each of the one or more first hosts comprising at least one user instance to be migrated out; and
    migrating the one or more user instances from the one or more first hosts to one or more second hosts.

13. The apparatus of claim 12, wherein the trigger condition for user scheduling comprises at least one of:
    the user instance distribution includes at least one user instance that is higher than a corresponding threshold information of user instance;

the user instance distribution includes at least one user instance of which deviation value is greater than a corresponding warning threshold information of user instance; and the user instance distribution includes at least one user instance that is greater than an upper limit of user instance equalization.

14. The apparatus of claim 12, wherein the migrating the one or more user instances from the one or more first hosts to the one or more second hosts comprises:

migrating, based on a priority descending order, the one or more user instances from the one or more first hosts to the one or more second hosts.

15. The apparatus of claim 14, wherein the acts further comprise:

determining a priority of the one or more user instance based on at least one of:

quantity information of user instances to be migrated out; and resource consumption for the multiple user instances.

16. The apparatus of claim 12, wherein the one or more second hosts comprises an idle host or a host that is available for a respective user instance to be migrated in and corresponds to the respective user instance.

17. The apparatus of claim 12, wherein the migrating the one or more user instances from the one or more first hosts to the one or more second hosts comprises:

migrating the one or more user instances from the one or more first hosts to the one or more second hosts when a host resource consumption is not greater than a corresponding equilibrium expected threshold of resource consumption after the one or more second hosts accept the one or more user instances.

18. The apparatus of claim 12, wherein the acts further comprise:

detecting whether a deviation value of host resource is greater than warning information of resource balance in response to determining that the trigger condition for user scheduling is not satisfied; and determining the one or more first hosts in response to determining that the deviation value of the host resource is greater than the warning information of resource balance.

19. The apparatus of claim 18, wherein the migrating the one or more user instances from the one or more first hosts to the one or more second hosts comprises:

migrating the one or more user instances from the one or more first hosts to the one or more second hosts based on an order of resource consumption for user instances from high to low.

20. One or more memories storing computer-executable instructions that, when executed by one or more processors, cause the one or more processors to perform acts comprising:

traversing a user instance distribution of multiple user instances of a user on one or more hosts in a cluster;

detecting that a trigger condition for user scheduling of adjustment of the user instance distribution is satisfied;

determining one or more first hosts from which one or more user instances are to be migrated out at least based on equilibrium information among the multiple user instances, the equilibrium information including a deviation value of a respective user instance from an equilibrium expectation value of host resources of the multiple hosts in the cluster based on a maximum host resources consumption of the multiple hosts in the cluster and current resource usage of the multiple hosts in the cluster, each of the one or more first hosts comprising at least one user instance to be migrated out; and migrating the one or more user instances from the one or more first hosts to one or more second hosts.

* * * * *